April 15, 1947.     D. L. ARENBERG     2,418,964
ELECTRO-MECHANICAL APPARATUS
Filed July 9, 1945     2 Sheets-Sheet 1
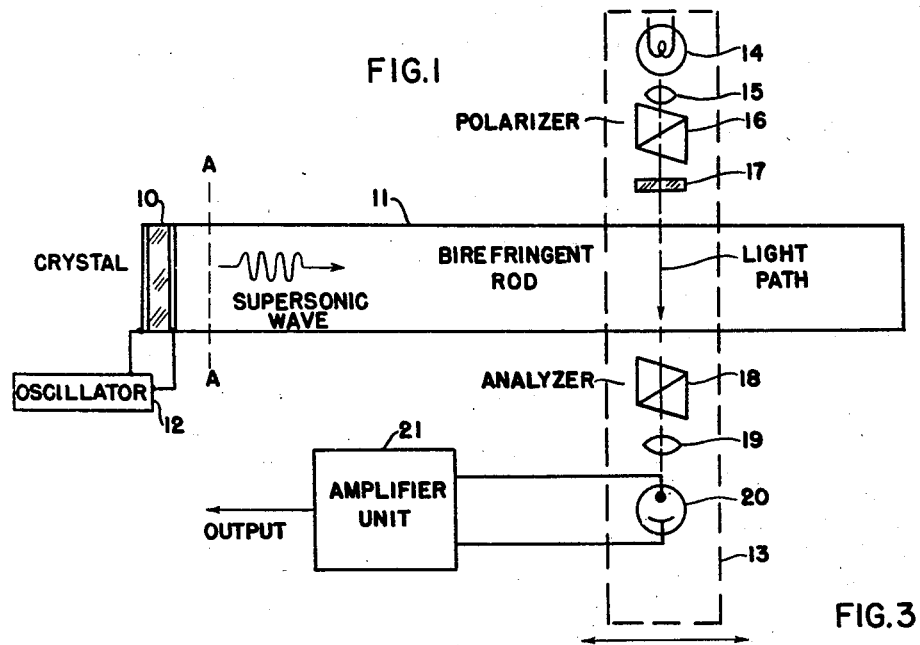
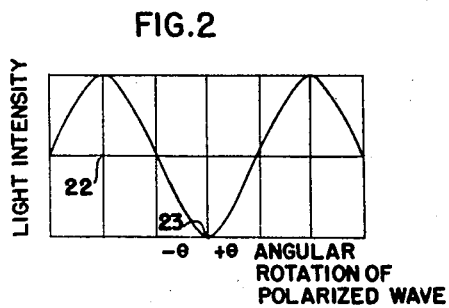
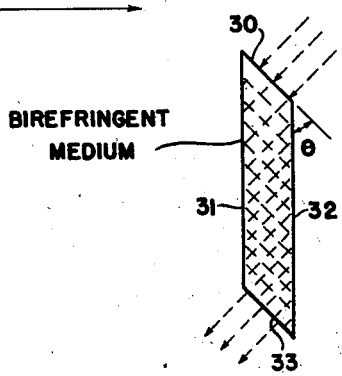
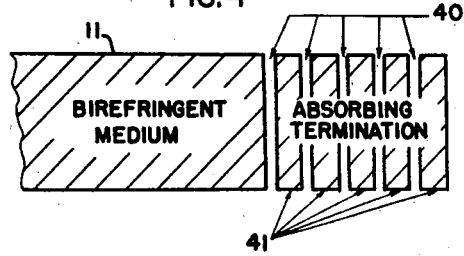
INVENTOR
DAVID L. ARENBERG
BY
William D. Hall
ATTORNEY April 15, 1947.  D. L. ARENBERG  2,418,964
ELECTRO-MECHANICAL APPARATUS
Filed July 9, 1945   2 Sheets-Sheet 2

INVENTOR
DAVID L. ARENBERG
BY
William D. Hall,
ATTORNEY

Patented Apr. 15, 1947

2,418,964

UNITED STATES PATENT OFFICE 2,418,964

ELECTROMECHANICAL APPARATUS

David L. Arenberg, Boston, Mass., assignor, by mesne assignments, to the Government of the United States of America, as represented by the Secretary of War Application July 9, 1945, Serial No. 604,046

14 Claims. (Cl. 161—15.2)

This invention relates in general to supersonic and photoelectric apparatus and more particularly to such apparatus as may be used for timing and indication purposes, and especially where such indication is used in some types of radio object-locating systems.

For some purposes in electrical communication apparatus, is desirable to use circuits having a large amount of time delay which may be applied to short pulses, the delay being of the order of milliseconds. It is very uneconomical and space-consuming to provide electrical circuits having time delays of this order of magnitude. Also, the use of electrical time delay circuits results in appreciable distortion of the pulse when the pulse is relatively long. However, the time for a stress wave to travel the length of a rod of solid material is of the order of magnitude of milliseconds. Therefore, this comparatively large time delay could be derived by converting an electrical impulse to a mechanical impulse, sending this energy in the form of a pressure wave down a rod of solid material, and converting the received mechanical impulse to an electrical impulse again.

This long time delay device may also be applied to some types of radio object-locating systems as a means of indication. As employed for some purposes, these systems use a directional antenna which periodically radiates high-frequency, high-powered pulses called reference pulses out into space. When these pulses of electromagnetic energy impinge upon an object having a dielectric constant differing from that of the atmosphere, a portion of this energy is reflected back toward the source. This "echo" pulse is detected, and its time phase is compared to that of the original transmitted reference pulse of which it was a part. The range of this object from the transmitting antenna can be determined, since the velocity of electromagnetic waves in space is known. A long time delay is adaptable to this system, since the pulse repetition period as used in practice is of the order of magnitude of milliseconds.

Accordingly, among the objects of the present invention are:

1. To provide an apparatus giving a comparatively long time delay to a mechanical or an electrical pulse;

2. To make such apparatus flexible enough so that the time delay may be variable; and 3. To provide components of the aforementioned apparatus which partially do away with certain errors inherent in such a device.

According to the present invention there is provided a piezoelectric crystal mechanically coupled to a solid rod having birefringent properties. The crystal is pulsed by a reference pulse and the supersonic wave formed thereby and traveling down the rod is detected by a photoelectric-polarized light apparatus positioned a distance down the rod, the detection being caused by the pressure wave turning the plane of polarization of the light passing through the rod, and being detected by a photo cell. The detected pulse is then compared with the reference pulse for the time delay. The polarized light is caused to enter the rod at an optimum angle to compensate for the partial depolarization caused by striated layers in some types of rods. A termination for the end of the rod opposite to the crystal of alternate thin layers of rod material and oil film is used to lessen reflections. The initial phase change of the original pulse caused by the mechanical mismatch between the crystal and the birefringent medium is taken care of by the use of another photoelectric apparatus located at some point near the crystal, the leading edge of the pulse from which is used as a reference time.

Another embodiment of the present invention furnishes a means for visually detecting the time difference between two pulses. The first of the pulses may be the reference pulse sent out into space by some types of radio object-locating apparatus and the second of the pulses may be the returning echo from a reflecting object. A crystal-birefringent rod-photoelectric device is used as in the first embodiment, but the polarized light is made to impinge upon the whole length of the rod. A reflecting wall is used at the far end of the rod so that the incident echo pulse is cancelled by an earlier reference pulse which is reflected from the end of the rod, and at the point of cancellation there is a change in the angle of polarization over the polarization angle caused by the remainder of the rod. This change in polarization is detected by a polarization analyzer. The time distance between the two pulses is measured by the physical distance along the rod of the cancellation point from the reflecting end of the rod. Another incorporation uses two rods with the reference pulse sent into one end of one rod and the echo pulse sent into the opposite end of the other rod. The variation in the birefringent properties of the two rods in the plane where the reference pulse meets one of the echo pulses is detected by a photoelectric apparatus and this position shows up on a sheet of polarized material.

This invention will best be understood by reference to the drawings, in which:

Fig. 1 is a functional diagram of one embodiment of the time delay device according to my invention;

Fig. 2 is a schematic diagram showing the effect of a "light bias" on the output of the photoelectric device shown in Fig. 1;

Fig. 3 is a functional diagram of one method of allowing the light to impinge on the birefringent medium of Fig. 1;

Fig. 4 illustrates a type of absorbing termination used in conjunction with this type of device;

Figure 5:
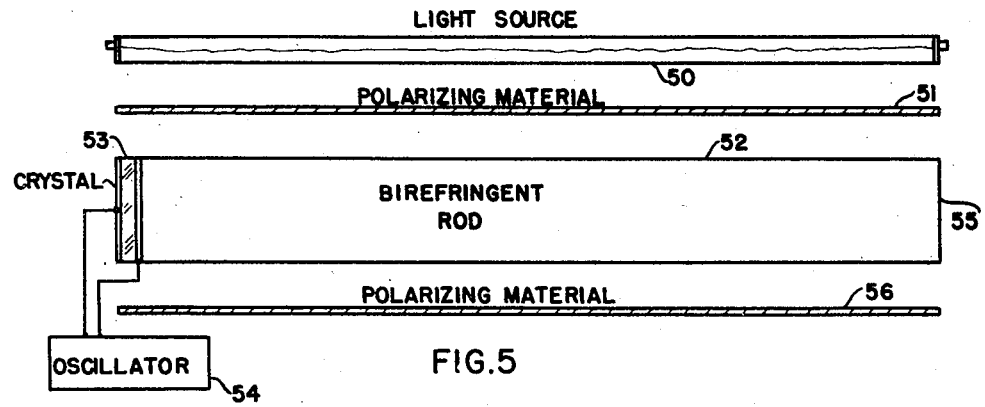
Fig. 5 is a functional diagram of another embodiment of the present invention which usually indicates the time duration between two pulses.

Referring now to a description of the first embodiment of the invention, and to Fig. 1, there is shown a piezoelectric crystal 10 mechanically coupled to a birefringent medium 11, which is in the form of a long straight rod. Commercial materials having suitable birefringent properties are glass and fused quartz. The crystal 10 is electrically coupled to an oscillator 12. A distance down the rod is a photoelectric device 13 having its long axis perpendicular to the long axis of the rod and which is on a carriage adjustable in position along the rod. The device 13 may consist of a light source 14, the radiation from which is focused by lens 15. The light rays emitted from lens 15 are plane-polarized by a contrivance such as a Nicol prism polarizer 16. A quarter wave plate 17 for light biasing purposes is positioned adjacent to the polarizer 16. On the other side of the birefringent medium 11 and in the path of the light rays from the plate 17 is positioned an analyzer, or detector, such as a Nicol prism analyzer 18. A lens 19 focuses the light from analyzer 18 onto a photo cell 20. The level of the output from the photo cell 20 is increased by amplifier unit 21.

Fig. 2 is an intensity curve of photoelectric device 13 and will be discussed later.

Fig. 3 is a possible cross section of the birefringent medium 11 of Fig. 1 taken parallel to the path of the main light rays of device 13. The light rays as represented by the arrows are caused to enter the medium 11 normal to face 30, which together with face 33 is inclined from sides 31 and 32 by an angle θ. The light rays leave the medium normal to face 33, as denoted by the arrows.

Fig. 4 shows a termination for the birefringent medium 11 with which the reflected wave is held to a very small percentage of the incident wave. At the end of medium 11 are alternate layers of oil film 40 and medium material 41, the layer contiguous to the medium 11 being an oil film.

Another embodiment of the present invention is illustrated by means of the functional diagram of Fig. 5. The light from a long light source 50 is made to impinge upon a thin screen of polarizing material 51 which causes polarized light to pass through birefringent medium 52. A piezoelectric crystal 53, which is electrically connected to an oscillator 54, is mechanically coupled to the medium 52, which is a rod of solid material. At the other end 55 of the medium 52 is a reflecting wall, usually just a polished face of the medium. In the path of the light rays from source 50 passing through medium 52 is positioned a thin screen of polarizing material 56. In one embodiment, polarizing materials 51 and 56 are of so-called "Polaroid."

Figure 6:
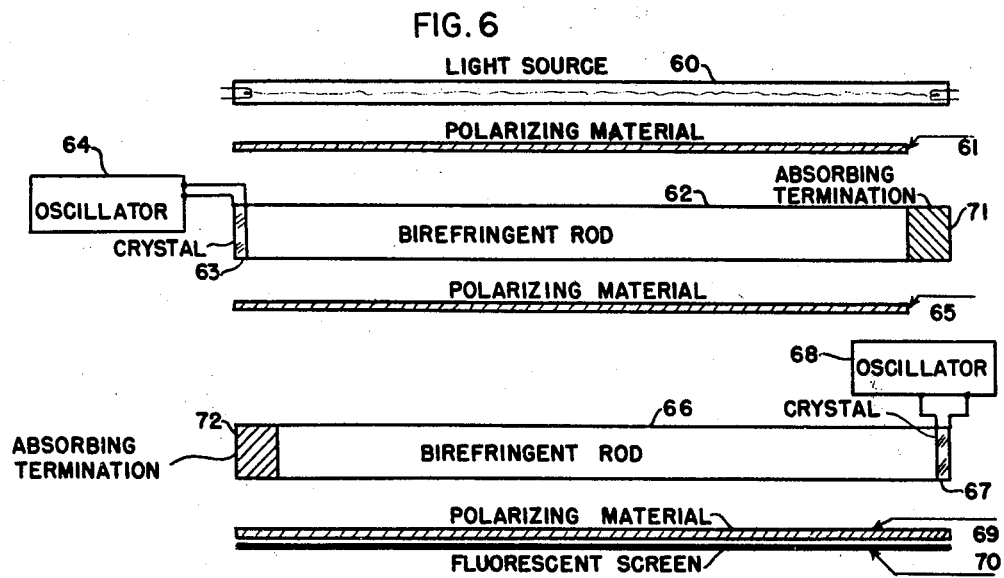
Fig. 6 is a functional diagram of another incorporation of the device of Fig. 5.

Another incorporation of the device of Fig. 5 is illustrated by the functional diagram of Fig. 6. A long light source 60 radiates light through a thin screen of polarizing material 61 and onto a birefringent medium 62 which usually consists of a long solid rod. Mechanically coupled to this medium 62 is a piezoelectric crystal 63, to which is electrically connected an oscillator 64. The light rays emitted from medium 62 pass through a second thin screen of polarizing material 65 and onto a second birefringent medium 66. Mechanically coupled to this medium 66 is a piezoelectric crystal 67 to which is electrically coupled an oscillator 68. Some of the light rays passing through medium 66 are caused to be conducted through a third thin screen of polarizing material 69 onto a fluorescent screen 70. Terminations 71 and 72 are used at opposite ends of mediums 62 and 66 respectively to prevent appreciable reflections from these ends. In one embodiment, the polarizing screens 61, 65 and 69 are of so-called "Polaroid."

Referring now to a description of the operation of the first embodiment of the invention and to Fig. 1, this apparatus is used to provide a variable, comparatively long, time delay which may be applied to an electrical pulse. The pulse that is to be delayed triggers the oscillator 12 which causes a mechanical vibration to occur in crystal 10 for a length of time approximately equal to the length of the pulse. The crystal 10 must be of such a cut so as to vibrate in such a manner that it will have a substantial component of vibrating motion parallel to the long axis of rod 11. The motion of the vibration of the crystal is coupled to the rod 11, down which a small bundle of mechanical vibrations is propagated, the frequency of which is in the supersonic range. The material of the rod 11 must have the property of birefringence, or double refraction. Common materials possessing this property are glass and fused quartz. Fused quartz is a desirable material to use, because it provides a low attenuation to the vibratory waves, it has a high coefficient of birefringence, it has a low temperature coefficient, and it provides a good mechanical match at the junction between the crystal 10 and the rod 11. The supersonic wave is detected by photoelectric device 13 and is sent to an amplifier unit 21, the output of which may be compared to the pulse input of the oscillator 12 for the time relationship between the two.

The detection of the supersonic wave is based on the property of a birefringent medium such as quartz to turn the plane of polarization of a beam of polarized light by an amount which depends upon the amplitude of the stress in the rod at the area through which the light is passed. The detecting device 13 may consist of a light source 14, the rays from which are condensed by lens 15 onto a polarizer 16. This may be a device such as a Nicol prism polarizer, the light output from which will be polarized in substantially one direction. From thence the now polarized light waves are passed through a quarter wave plate 17, which may take the form of a bi-axial crystal. The purpose of this plate is substantially to bias the light to an optimum value. The light passing through the plate 17 is transmitted through the birefringent rod 11 into an analyzer, or detector, such as a Nicol prism analyzer. The light that is allowed to pass through the analyzer is condensed by a lens 19 onto a photo cell 20. Under the quiescent condition of no waves passing down the rod 11, the polarization direction of the analyzer 18 is set approximately perpendicular to that of the polarizer 16. Under this condition, and ignoring for the moment the effect of the quarter wave plate 17, the photo cell will receive no signal when the rod is unexcited. When the oscillator 12 is pulsed, and a short burst of supersonic waves travels down the rod and crosses the path of the polarized light beam, the angle of polarization of the beam will be turned, the analyzer will allow some of the light to pass through it, and the photo cell 20 will receive a signal which varies at a supersonic frequency. The output of the photo cell 20 is amplified by an amplifier unit 21 and will then be of sufficient amplitude to be compared with the input pulse to the oscillator 12.

It can be seen that only when the train of supersonic waves crosses the path of the polarized light beam will the photo cell 20 produce an output. Thus this output will be a series of pulses each of which is delayed from an input pulse by substantially the amount of time it takes a stress wave to travel from the crystal 10 to the path of the polarized light beam. The photoelectric unit 13 is made on a carriage so as to be movable along the length of the rod 11. This will allow the time delay to be variable over a wide range.

Due to the mechanical mismatch always present between the crystal 10 and the rod 11, there will be an inherent phase shift at the point of contact between the two. That is, there will be a lag in the time the supersonic impulse starts to pass down the rod as compared to the time the crystal is pulsed in this type of photoelectric detection device. Furthermore, this phase lag is not easily calculated. This may be compensated for by the use of another photoelectric unit such as unit 13 at some point near the crystal, as along axis AA. The output from the unit may then be used as the reference, or zero time for the system.

If it is desired to compare the shapes of the input pulse and the output pulse, it would be found that, due to the non-linearity of the action of the rod and the photo cell, the output pulse would be greatly distorted. However, with another unit such as 13 at axis AA, the output pulses of this unit and those of the regular unit 13 may be compared and the two pulse shapes will be found to be substantially the same.

In some instances, the supersonic wave traveling down the rod is a combination of longitudinal waves and transverse waves. The velocities of propagation of the two types of waves in such a rod are not equal, and their signals must be resolved. Since each of these waves produces a different change in birefringence, proper orientation of the polarizing elements in this type of photoelectric detection device will discriminate between the two.

The effect of the quarter wave plate 17 is to adjust the initial conditions of the light beam reaching the photo cell 20 to optimum sensitivity. Fig. 2 is a graph of the variation in light intensity falling on the photo cell 20 as a function of angular rotation of the plane of polarization of the light. It is seen that at point 23, which corresponds to operation without the quarter wave plate, any stress in the rod in the path of the polarized light beam will cause an increase of light falling on the photo cell, since the initial light intensity is substantially zero. The quarter wave plate adds an initial birefringence and thus a constant amount of angular rotation delta of the plane of polarization. The quiescent light intensity is therefore an amount 22, and a variation in stress in one direction will result in an increase in light intensity, while a variation of stress in the other direction will result in a decrease in light intensity. If the angle of turning of the plane of polarization by the change in birefringence in the rod is $\theta$, the curve of Fig. 2 is of the form $\sin^2(\theta+\text{delta})$. For such a curve the change in ordinate is greater for a given change in abscissa along axis 22 than it is at point 23. The use of the quarter wave plate, therefore, is to adjust the light conditions to those of optimum sensitivity.

Since operation with the quarter wave plate about axis 22 will give an increase in light intensity to the photo cell for, say, a peak in the supersonic wave and will give a decrease for a trough, some arrangement must be made, if the width of the light beam is appreciably greater than half the supersonic wavelength, to allow the beam to fall on a section of rod 11 that is only a half wavelength long. This can be accomplished by using a transparent grid having alternate half wave length sections blacked out, inserted into the path of the polarized light at the surface of the rod. A quarter wave plate is generally understood to be a bi-axial crystal adapted to produce a differential phasing of 90° between light waves which are at right angles to each other propagating through the crystal.

Types of glass or quartz rods that can be obtained commercially contain striated regions having refraction characteristics different from those of the main body of the material. A substantial portion of these striations lie parallel to the path of the light from unit 13, Fig. 1. Hence, some of these rays are affected for a different path length than the others in passing through the rod 11, with the result that the rays emerging from the rod 11 are variously polarized. This introduces an initial birefringence which cannot be completely compensated for by orientation of the polarizer 16, analyzer 18 and quarter wave plate 17. Furthermore, this lowers the conversion efficiency of the system, from supersonic signal to light signal. To overcome this difficulty the present invention employs a rod 11 which has the cross section substantially as shown in Fig. 3. The light entering the rod strikes it with its rays normal to face 30. After being reflected from walls 31 and 32 several times, the rays come out of the rod normal to face 33. Since the striated layers are essentially parallel to walls 31 and 32, it is seen that all rays of light will traverse approximately the same number of striated layers. If it is desired to operate at point 23, Fig. 2, any residual birefringence may be removed by means of a quarter wave plate, similar to plate 17, Fig. 1. However, it is found that by carefully selecting the number of internal reflections of the light beam in traveling through the cross section of Fig. 3, it is possible to produce a phase shift sufficient for operation about axis 22, Fig. 2. This phase shift is substantially independent of the wavelength of the light, while that through a bi-axial crystal varies with the wavelength. If the birefringent medium 11 is of "Pyrex," the optimum acute angle between face 30 and wall 31 is 51°.

In some applications of the device shown in

Fig. 1, it is desirable that there be no reflections from the end of the rod 11 opposite to that holding the crystal. The device shown functionally in Fig. 4 is a solution to the problem in accordance with the present invention. At the end of the principal medium 11 is a series of thin strips 41 of the material of the medium, each strip being separated by a thin film of oil 40. If the thickness of the strips and the thickness of the oil film are both a fraction of a wavelength, the reflections from such a termination are very small.

Referring now to the operation of the device shown in Fig. 5, it is seen that it is a direct adaptation of the timing apparatus of Fig. 1. The arrangement of Fig. 5 is applicable to some types of radio object-locating systems. A light source 50 which is physically long radiates light through a screen 51, which polarizes the light. This polarized light passes through birefringent medium 52 and through another polarizing screen 56. The two screens 51 and 56 are positioned with their polarizing axes at such an angle with each other that substantially no light is allowed to come through screen 56, with no signal applied. The optical axis of the two screens are thus substantially at right angles.

The reference pulse of the aforementioned radio object-locating system pulses oscillator 54, which allows crystal 53 to oscillate for a small period of time, starting a supersonic wave traveling down the medium 52. The wave reaches the end 55, which is a highly reflecting termination, reverses phase upon reflection, and travels back toward the crystal end. Since the apparatus is adjusted under no-signal conditions so that no light comes through the screen 56, a traveling line of light is present on the outside of the screen 56 adjacent to the position of the supersonic pulse. This line comes about because of the increased turning of the plane of polarization of the polarized light in the area of the supersonic wave. Since the velocity of this pulse down the medium 52 is high, persistence of vision causes the whole length of screen 56 to appear to be lighted up if the repetition rate of the reference pulses is high enough. The above-mentioned condition will be the case when the time distance between pulses is greater than the time it takes for a supersonic wave to travel twice the length of the rod 52. If the echo pulse is also allowed to pulse the oscillator 54, which will be a short time after the reference pulse starts down the rod, there will be a series of double pulses traveling down the rod 52 spaced at a distance which depends upon the range of the object causing the echo. Due to the 180° phase inversion upon being reflected from wall 55, the reflected reference pulse will cancel a large portion of the direct echo pulse, thus giving a small portion of the rod 52 in which substantially no stress occurs. At this point, which will be at a distance from the end 55 of the birefringent rod proportional to the range of the target causing the echo, a dark line will appear on the screen 56.

The apparatus just described has the disadvantage of being able to display only one echo pulse at a time, without causing ambiguous dark lines to appear. This advantage is done away with in the device of Fig. 6. A physically long light source 60 emanates rays through a first polarizing material 61, thence through a birefringent rod 62 and thence through a second polarizing material 65. The optical axes of material 61 and material 65 are substantially mutually perpendicular. Under conditions of no signal in the rod 62, no light passes through the second polarizing material 65. When a reference pulse is generated by the radio object-locating apparatus, the oscillator 64 allows the crystal 63 to oscillate for a short time. The resultant supersonic wave traveling down rod 62 admits light through that portion of the second polarizing material 65 that is opposite the stress wave. The third polarizing material 69 has its optical axis in a direction substantially perpendicular to the direction of the polarization of the light that comes out of the second polarizing material 65 adjacent to a portion of the rod in which the pressure wave is traveling. Thus, when no stress wave is sent up birefringent rod 66, no light signal is allowed to pass through the third polarizing material 69. In operation, however, the echo pulses are made to trigger the oscillator 68 which in turn causes crystal 67 to vibrate for a short period of time. A stress wave then travels up the rod 66 in an opposite direction to that of the wave in the rod 62. When an echo pulse wave becomes opposite to a reference pulse wave, light is allowed to pass through the third polarizing material 69 and a line of light appears on the outside of this material against a dark background. The birefringent rods 62 and 66 must have non-reflecting terminations 71 and 72 respectively to avoid ambiguity.

This apparatus has a higher contrast than the device of Fig. 5, which contrast may be increased still further by placing a long lens next to the third polarizing material 69 and focusing the light on a screen 70, which may be fluorescent.

It is seen that if the reference pulse starts at crystal 63 in rod 62 at the same time that the echo pulse starts at crystal 67 in rod 66, the two stress waves will be opposite one another in the center of the screen 70. This corresponds to zero range of the object causing the echo. If the echo pulse starts at a time later than the reference pulse, the two pulses will be opposite one another at a point to the right of the center of the apparatus. Thus the useful range of the screen 70 equals the half of the total length to the right of the center. It can be seen that a large number of echo pulses may be represented by this arrangement.

A type of radio object-locating system presentation which is called "plan position indication" (PPI) may be obtained by mounting the apparatus of Fig. 6 on a pivot placed at the left end of the apparatus and rotating it in synchronism with the rotation of the directional antenna that is sending out the reference pulses. The presentation will then give the position of the located object in polar coordinates of distance of target from the antenna and azimuth angle. The antenna will be represented at the center of such a display.

It is to be understood that the incorporations described herein are used merely as examples, and that they are not to be held to uses in time delay devices and radio object-locating apparatus only.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. In a supersonic wave translation device for measuring the time duration of a second pulse with respect to a reference pulse, a source of pulses, mechanical vibratory means into which is fed the pulses, said vibratory means oscillating when said pulses are sent into it, a birefringent medium into which is coupled said vibratory means, the vibration of said vibratory means causing a vibration wave to travel down said birefringent medium and to cause an instantaneous change in the polarization properties thereof in the volume thereof instantaneously affected by said vibration wave, a source of polarized light, and a polarization detector for detecting the variation in angle of polarization of said polarized light caused by said light passing through said birefringent medium at the point affected by said vibration wave.

2. In a supersonic wave translation device for measuring the time duration of a second pulse with respect to a reference pulse, a source of pulses, an oscillator into which is fed the pulses, said oscillator oscillating when said pulses are sent into it, a piezoelectric crystal connected to said oscillator which vibrates in accordance with the oscillation of said oscillator, a birefringent medium into which is coupled said crystal, the vibration of said crystal causing a vibration wave to travel down said birefringent medium and to cause an instantaneous change in the polariaztion properties thereof in the volume thereof instantaneously affected by said vibration wave, a source of polarized light, and a polarization detector for detecting the variation in angle of polarization of said polarized light caused by said light passing through said birefringent medium at the point affected by said vibration wave.

3. In a time delay device, a source of first pulses, an oscillator into which is fed said first pulses, said oscillator operating at the time each of said first pulses are fed into it, a piezoelectric crystal connected to said oscillator and vibrating in accordance with the oscillation of said oscillator, a birefringent medium, means for coupling said crystal to said birefringent medium, the vibration of said crystal causing a vibration wave to travel down said birefringent medium and causing an instantaneous change in the polarization properties thereof in the volume thereof instantaneously affected by said vibration wave, a source of polarized light spaced apart from said crystal, and a light-translating means for detecting the variation in angle of polarization of said polarized light passing through said medium at the point affected by said vibration wave, said polarization-translating means comprising a source of light, a polarizer through which some of the light from said source passes, a polarization analyzer through which the light form said polarizer and from said birefringent medium passes, and a light responsive cell upon which falls a portion of the light which comes through said analyzer, said light responsive cell generating a signal at the time said vibration wave varies the birefringence of said birefringent medium in the path of said light beam.

4. In a time delay device, a source of first pulses, an oscillator, means for keying said oscillator by means of said first pulses, said oscillator operating at the time each of said first pulses are fed into it, a piezoelectric crystal connected to said oscillator and vibrating in accordance with the oscillation of said oscillator, a birefringent medium, means for coupling said crystal to said birefringent medium, the vibration of said crystal causing a vibration wave to travel down said birefringent medium and causing an instantaneous change in the polarization properties thereof in the volume thereof instantaneously affected by said vibration wave, a source of polarized light spaced apart from said crystal, and a first polarization detector for detecting the variation in angle of polarization of said polarized light passing through said medium at the point affected by said vibration wave, means forming said detected light into a second electrical pulse, the time delay of said second pulse with respect to said first pulse being dependent upon the distance of the intersection of the axis of said light and said rod to said crystal.

5. Apparatus in accordance with claim 3 in which is positioned a second polarization detector on the birefringent rod in the neighborhood of said crystal, the action of said second detector being essentially the same as that of said first detector, the axis of said second detector being used as the reference point for the time delay of said birefringent medium, said arrangement effectively determining the phase shift between said crystal and said birefringent medium.

6. Apparatus in accordance with claim 4 in which is positioned a second polarization detector on the birefringent rod in the neighborhood of said crystal, the action of said second detector being essentially the same as that of said first detector, the axis of said second detector being used as the reference point for the time delay of said birefringent medium, said arrangement effectively determining the phase shift between said crystal and said birefringent medium.

7. Apparatus in accordance with claim 3 in which is positioned a second polarization detector on the birefringent rod in the neighborhood of said crystal, the action of said second detector being essentially the same as that of said first detector, the axis of said second detector being used as the reference point for the time delay of said device, and means for causing the output pulse shape of said second detector to be substantially similar to the output pulse shape of said first detector.

8. Apparatus in accordance with claim 4 in which is positioned a second polarization detector on the birefringent rod in the neighborhood of said crystal, the action of said second detector being essentially the same as that of said first detector, the axis of said second detector being used as the reference point for the time delay of said device, and means for causing the output pulse shape of said second detector to be substantially similar to the output pulse shape of said first detector.

9. Apparatus in accordance with claim 4 wherein the shape of the cross section of said birefringent medium normal to the direction of travel of said vibration wave is substantially that of a parallelogram with two acute angles.

10. In a medium for transmitting a pressure wave, a termination comprising alternate thin layers of oil film and of the material of the medium, said layers being positioned normal to the direction of travel of the pressure wave, the thickness of each of said layers of said oil film and said material being equal to a fraction of a wavelength of said pressure wave, said termination preventing an appreciable amount of reflection of said pressure wave from the termination of said medium.

11. In an electronic apparatus for comparing the time phase of at least two pulses, a source of light, a first polarizing means through which at least a portion of said light passes, a rod-shaped birefringent medium through which a portion of the polarized light from said first polarizing means passes, an oscillator, means by which said oscillator is caused to operate under the influence of two of said pulses, a crystal vibrating in accordance with the oscillations of said oscillator, means for mechanical coupling said crystal to one end of said birefringement medium, the vibration of said crystal sending an oscillating pressure wave traveling down the birefringent medium, said pressure wave being reflected from the end of said birefringent medium with a phase shift of substantially 180°, a second polarizing means having its optical axis substantially at right angles to the optical axis of said first polarizing means, whereby substantially no light passes through said second polarizing means in the absence of a pressure wave in said birefringent medium, whereby the said two pulses cause an instantaneous change in the birefringent properties of said birefringent medium in the volume thereof instantaneously affected by said vibration wave, the change in birefringence caused by the first of said two pulses allowing light to pass through said second polarizing means, the incident wave of the second of said pulses substantially cancelling out the reflected wave of the first of said pulses when said two waves are in substantially the same volume in said birefringent medium, said cancellation causing a dark line to appear on the outside of said second polarizing means opposite said volume where said two waves meet.

12. In an electronic apparatus for comparing the time phase of at least two pulses, a source of light, a first polarizing means through which at least a portion of said light passes, a birefringent medium through which a portion of the polarized light coming from said first polarizing means passes, a mechanical vibrating means, means to transfer said two pulses into said mechanical vibrating means, means to cause said mechanical vibrating means to vibrate under the influence of said two pulses, said vibration causing an oscillating pressure wave to travel down said birefringent medium, said pressure wave being reflected from the end of said birefringent medium with a phase shift of substantially 180°, a second polarizing means having its optical axis substantially at right angles to the optical axis of said first polarizing means, whereby substantially no light passes through said second polarizing means in the absence of a pressure wave in said birefringent medium, whereby the said two pulses cause an instantaneous change in the birefringent properties of said birefringent medium in the volume thereof instantaneously affected by said pressure wave, the change in birefringence caused by the first of said two pulses allowing light to pass through said second polarizing means, the incident wave of the second of said pulses substantially cancelling out the reflected wave of the first of said pulses when said two waves are in substantially the same volume in said birefringent medium, said cancellation causing a dark line to appear on the outside of said second polarizing means opposite said volume where said two waves meet.

13. In a radio object-locating apparatus for comparing the time phase of a group of pulses with respect to the first pulse of said group, a source of light, a first polarizing means through which passes a portion of the light from said source, a first birefringent medium through which a portion of the light coming through said first polarizing means passes, a first oscillator means, means causing said first oscillator means to operate by the first of said pulses, a first crystal mechanically coupled to said first birefringent medium, said first crystal being electrically coupled to said first oscillator, means causing said first crystal to vibrate at the time the first of said pulses is transferred to said first oscillator, the vibration of said first crystal causing a first oscillating pressure wave to travel down said first birefringent medium, said first oscillating pressure wave causing an instantaneous change in the birefringent properties thereof in the volume thereof instantaneously affected by said first pressure wave, a second polarizing means having its optical axis substantially at right angle to the optical axis of said first polarizing means, whereby substantially no light passes through said second polarizing means in the absence of a first pressure wave in said first birefringent medium, means to allow a portion of the light coming through said first birefringent medium in the volume occupied by said first pressure wave to pass through said second polarizing means, a second birefringent medium through which a portion of the light coming from said second polarizing means passes, a second oscillator means, means causing said second oscillator means to operate in accordance with each of said remaining pulses, a second crystal mechanically coupled to said second birefringent medium, said second crystal being electrically coupled to said second oscillator, means causing said second crystal to vibrate at the time each of the remaining of said pulses is transferred into said second oscillator, the vibration of said second crystal causing at least a second oscillating pressure wave to travel down said second birefringent medium, the direction of travel of said second pressure wave being substantially opposite to the direction of travel of said first pressure wave, said second oscillating pressure wave causing an instantaneous change in the birefringent properties of said second birefringent medium in the volume occupied by said second pressure wave, a third polarizing means having its optical axis at substantially right angles to the optical axis of the light emerging from said second polarizing means, a portion of the light passing through said second birefringent medium and through said second pressure wave while said second pressure wave is substantially opposite to said first pressure wave passing through said third polarizing means, whereby a bright line appears on said third polarizing means substantially adjacent to the position of said first pressure wave and said second pressure wave when said two pressure waves are opposite each other.

14. In a multiple pulse indication apparatus, a source of light, a first polarizing means through which passes a portion of said light, a first birefringent medium through which a portion of the light coming through said first polarizing means passes, a first vibration means, means coupling said first vibration means to said first birefringent medium, means transferring the first of said pulses into said first vibration means, said first vibration means sending first oscillating pressure waves down said first birefringent medium, said first pressure waves producing a change in birefringent properties thereof in the volume thereof instantaneously affected by said first pressure waves, a second polarizing means having an optical axis substantially at right angles to the optical axis of said first polarizing means, whereby substantially no light passes through said second polarizing means in the absence of a first pressure wave in said first birefringent medium, means to allow a portion of the light coming through said first birefringent medium to pass through said second polarizing means opposite to the instantaneous volume occupied by said first pressure wave, a second birefringent medium through which a portion of the light coming from said second polarizing means passes, a second vibration means, means feeding pulses other than said first pulses into said second vibrating means, said second vibration means sending second oscillating pressure waves down said second birefringent medium, the direction of travel of the second oscillating pressure waves being substantially opposite to the direction of travel of the first oscillating pressure wave, a third polarizing means having its optical axis substantially at right angles to the optical axis of said second polarizing means, whereby a portion of the light passing through said second birefringent medium and through said second oscillating pressure wave passes through said third polarizing means, whereby a bright line appears on said third polarizing means substantially opposite to the position where said first pressure wave and said second pressure wave are opposite each other.

DAVID L. ARENBERG.

REFERENCES CITED

The following references are of record in the file of this patent:

UNITED STATES PATENTS

| Number | Name | Date |
| --- | --- | --- |
| 1,854,003 | Tischner | Apr. 12, 1932 |
| 1,939,532 | Zworykin | Dec. 12, 1933 |
| 1,954,947 | Pajes | Apr. 17, 1934 |
| 2,230,836 | Hammond | Feb. 4, 1941 |
| 2,210,415 | Kellogg | Aug. 6, 1940 |
| 2,392,350 | Willard | Jan. 8, 1946 |
| 2,394,461 | Mason | Feb. 5, 1946 |